Sept. 21, 1954 W. N. ANGELUS 2,689,517
COMBINATION BROILER AND TOASTER
Filed Aug. 3, 1951 2 Sheets-Sheet 1

INVENTOR
William Nicholas Angelus

BY Dean Lawrence

ATTORNEY

Sept. 21, 1954          W. N. ANGELUS          2,689,517
COMBINATION BROILER AND TOASTER
Filed Aug. 3, 1951                          2 Sheets-Sheet 2

INVENTOR
William Nicholas Angelus

BY  Dean Lawrence
ATTORNEY

Patented Sept. 21, 1954

2,689,517

UNITED STATES PATENT OFFICE 2,689,517

COMBINATION BROILER AND TOASTER

William N. Angelus, Alma, Mich.

Application August 3, 1951, Serial No. 240,163

3 Claims. (Cl. 99—345)

This invention relates to broilers and more particularly relates to a broiler whereby a plurality of pieces of food may each be cooked to individual predetermined degrees.

The prior art has utilized a broiler for cooking meats which has generally cooked, at one time, only one type of order, e. g., a "well-done" steak. Further, it has not been the general practice to utilize conveyor means in the normal broiler due to expense in maintaining the unit in operating condition within the cooking area and the general inexperience in mechanical-electrical maintenance of the class of people using the unit.

A principal object of this invention is to provide a simple inexpensive apparatus capable of broiling and toasting several orders cooked in varying degrees simultaneously within the same period of time.

A further object of this invention is to provide a unit broiler which is easily cleaned and maintained by those normally employed in the art of preparing food.

Another object of this invention is to provide a broiler which has heating units disposed so that there is no burning of the greases or juices which exude from the meats during cooking.

A still further object of this invention is to provide a broiler wherein the drip pans are not exposed to the heat of the elements, thereby eliminating the smoke and odors customarily occurring with heating and/or burning of such greases or juices.

An additional object of this invention is to provide a broiler which will cook steaks, chops, fish and other meats by broiling and toasting, and will toast bread, buns, et cetera.

Another object of this invention is to provide a broiler which will cook opposite sides of the food simultaneously.

An additional object of this invention is to provide an apparatus for cooking meats whereby the heating or cooking surface initially is not appreciably cooled by the meats when they are placed in the cooking area.

My invention includes the novel combination, the parts and combinations thereof and the mode of operation fully described in the specification and illustrated in the accompanying drawings.

Figure 1:
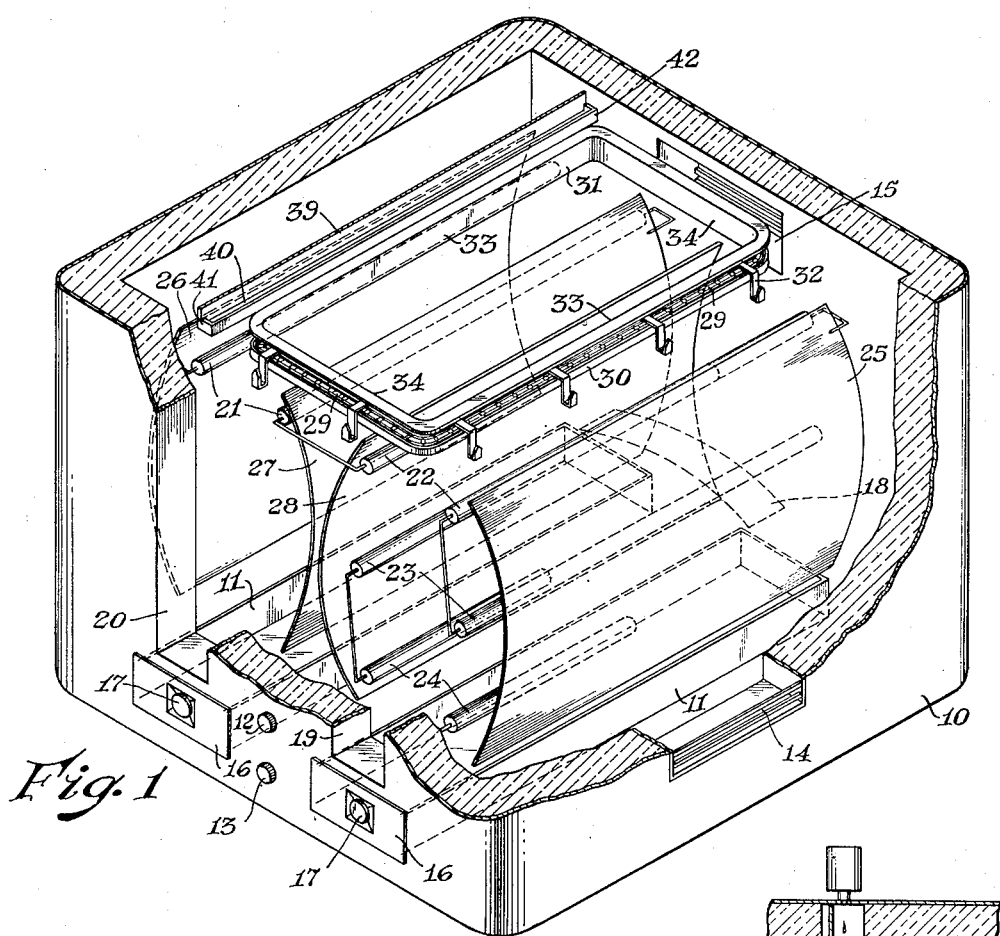
Figure 1 is a cutaway in perspective.

Referring more particularly to the drawings, the broiler has an insulated case 10 which is provided with cutouts or openings where through the broiler drip pans 11, the food, the motor speed controls 12, the heating element control switch 13 and the louvers for the air vents 14 and 15 can be inserted into the case.

The drip pans 11, slidably mounted through the cutouts in the front of the case, are rectangular in shape. The front end of each drip pan is provided with a flange 16 around the periphery of the pan slightly larger than the opening in the case. A flush recessed knob 17 is secured to the front of each drip pan to facilitate opening. Between and above the drip pan secured to the rear wall of the case and extending toward the front of the case under the rear food passage is a shield 18 to deflect grease and juices from the meat into the drip pans during the traverse of the meat around the back side or rear food passage between the cooking areas.

Suspended from the top of the case on either side of each of the openings 19 and 20 in the case extending substantially from the front of the case to substantially the rear wall thereof leaving space therebetween for passage to the next cooking area and extends down from the top of the case approximately one-third of the distance into the cooking areas are two pairs of electric heating elements 21 and 22. Suspended immediately below one of the aforesaid pairs of heating elements on each side of one of the openings 19 only and extending substantially from the front of the case to substantially the rear wall thereof leaving a space for passage from the left heating area and located in the next adjacent lower one-third of the cooking area, i. e., the middle one-third, is another pair of heating elements 23 which provides for cooking meats which are to be "medium-done." Suspended within the lower one-third of one of the cooking areas, and extending substantially from the front of the case to approximately one-half to two-thirds the distance from the front wall of the case to the rear wall of the case is a third pair of heating elements 24 which provide for cooking meats which are to be "rare."

Surrounding the aforesaid elements on each side of the cutouts where through food can be inserted into the case and suspended from the top of the case are four concave heat distributing reflectors, two of which, 25 and 26, are mounted between the heating elements and the case side walls in position to reflect and irradiate the food by spreading the heat from the heating elements in diverging rays toward the center of the cooking areas. The other two heat distributing reflectors, 27 and 28 suspended from the top of the case are between the two heating areas in position to reflect and irradiate the food by spreading the heat rays from the heating elements in diverging rays toward the center of the cooking areas. The reflectors thus define vertical heating areas and are made from an aluminum alloy which reflects heat rays when polished and insulates against loss of heat by conduction through the reflectors and radiation away from the unpolished sides of the reflectors.

A conveying chain 29 lies in a guide flange 30 of a continuous rectangular trackway 31 attached to the top of the case positioned so that hooks 32 hanging from the conveyor chain 29 within the guide flange or lip 30 will pass between the heating elements. The trackway has parallel sides 33 substantially over the right and left cooking areas and laterally disposed ends 34 to guide the conveyor chain continuously in its travel along the track. A motor 35 for driving the conveyor chain 29 is suspended from the top of the case. The motor 35 has a control circuit, the switch 12 of which is mounted on the front of the case through a cutout. A train of gears 36 cooperatively driving a sprocket 37 which sprocket 37 engages the conveyor chain 29 and is used to drive the conveyor chain 29 which is mounted on the trackway within a guide flange or a lip 30 running around the lower edge of the trackway. Mounted at intervals on the conveyor chain are hooks 32 shaped so as to receive the wire baskets or food holders 38 and move said holders through the cooking areas.

Adjacent each trackway rail 33 on each side thereof above the right and left cooking areas is mounted a pair of channels 39 perforated on their bottom side 40. The forward ends 41 extend to the cutouts in the case where through food may be inserted and the channels are closed at their ends 41 and 42 to retain the basting sauce within the channels.

Mounted on the side wall within the cutout provided in the case, is a louvered vent 14 and mounted on the rear wall of the case adjacent the top thereof is a cutout or opening 15 where through a louvered vent or an exhaust fan intake pipe can be inserted to cooperate with the louvered vent 14 in the side wall in providing ventilation needed within the case.

Figure 4:
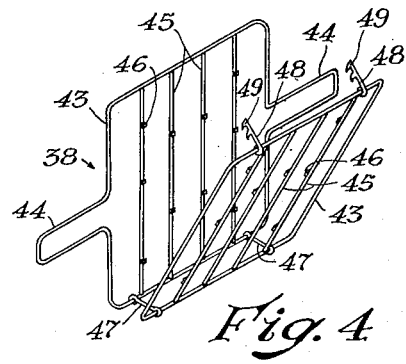
Figure 4 is a perspective of the food holder.
Figure 5:
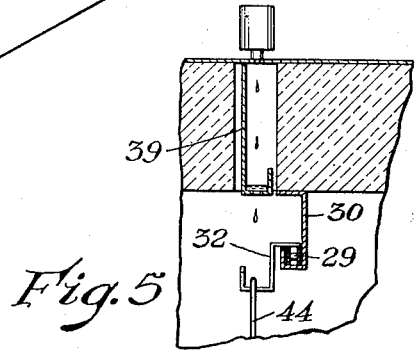
Figure 5 is a fragmentary view through the top and side.
Figure 3:
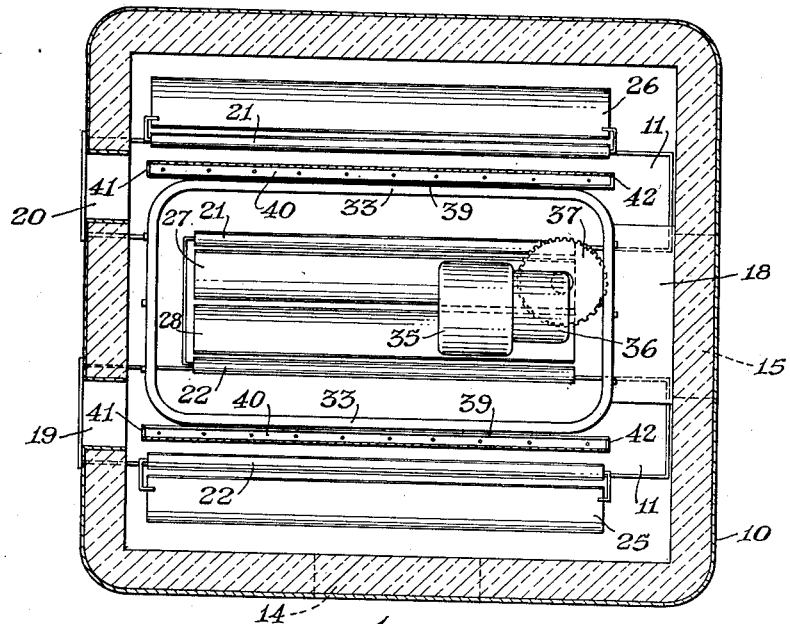
Figure 3 is a top plan.
Figure 2:
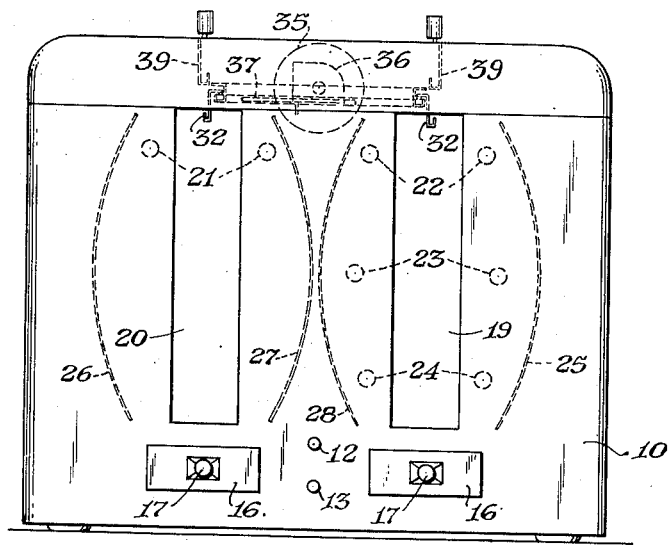
Figure 2 is a front elevation.

The wire baskets or food holders 38 illustrated in Fig. 4 of the drawings, include a pair of rectangular wire frames 43 having in the same plane, as an integral part of the frame, on opposite sides of the frame two U-shaped projections 44 which engage the conveyor chain hooks 32 to carry the basket through the cooking area. Within the plane of the frame 43 are mounted rods 45 of substantially the same diameter as the frame. Welded to each aforesaid rod at right angles thereto are a plurality of pins 46 to support the food in positive position within the frame. The frames are pivotally secured to each other through rods 47 which are pivotally secured to each of the frames which are held in close relation to each other by ratchet bars 48 which are pivotally mounted on one frame in opposite relation to the aforementioned rods 47 and engage the other frame through the teeth 49 of the bar.

In operation, using steaks as the meat to be broiled, the heating elements are turned on to bring the cooking area up to the required heat for broiling. The steaks, e. g., three in number, one to be "well-done," one to be "medium" and the third to be "rare," are placed in the steak holder or held by clamps, if the steak has a bone which the clamp will engage, in position so that the steak to be "well-done" will be in the top one-third of the steak holder, the steak to be "medium" next or in the middle one-third, and the steak to be "rare" in the bottom one-third of the holder. The motor switch is turned on and the conveyor chain, and hooks carried thereby, begins to move along the trackway. The steak holder is placed on one of the hooks and allowed to travel through the heating area. The speed of the travel of the conveyor chain is regulated to the required fineness to insure thoroughly cooking or broiling of the food. While in the left cooking area only the top steak will receive direct cooking heat, the other two steaks receive some reflected heat but not enough to do any substantial cooking. As the steaks progress out of the left cooking area around the back passage and into the right cooking area, the top steak again receives direct cooking heat, the middle steak also receives direct cooking heat throughout the entire travel of the right cooking area, while the lowest steak receives cooking heat when the steaks have traveled approximately one-third to one-half of the right cooking area.

The food can be basted during travel through the cooking area by placing the basting sauce within the pairs of perforated channels provided on each side of the right and left cooking areas. The holder emerges from the cooking area and is taken from the broiler, the hooks traveling around again until turned off by the motor switch. The top steak in the holder is "well-done," the middle steak "medium" and the bottom steak "rare."

It is to be understood that the above description is the preferred embodiment, but that variations may be made in design and structure without departing from the scope of my invention. For example: The heating elements may be reversed, i. e., the three elements described as on the right side of the cooking area can be put on the left side of the cooking area while the single element of the left side of the cooking area can be placed on the right side of the cooking area. It is also possible to reverse the direction of the motor so that the steaks travel from the right side of the cooking area to the left side of the cooking area instead of as described above.

The food holder can be merely a clamp provided with a cutout where through the conveyor hook can be inserted if the meat or food has a bone or substantial body to it.

The advantages of my invention, apparent from the above disclosures, are the labor saved by being able to cook more than one order of food to an individual predetermined degree of both sides simultaneously, the motor control feature enabling a fine adjustment of cooking time for duplication of orders, and the additional advantage that orders for several individual predetermined degrees come out of the apparatus simultaneously and can be served hot without having to be put in warming ovens until the orders are filled.

Various changes may be made in the above-described invention without departing from the spirit or scope thereof and it is to be understood that I limit myself only as defined in the appended claims.

I claim:

1. A combination broiler and toaster comprising: An insulated case, said case provided with cut-outs for louvers, a speed control shaft, a heating element control switch, food holders, and drip pans; two cooking passages consisting of narrow vertically positioned areas; heating elements and heat reflectors flanking said cooking passages, said heating elements being of various lengths from front to rear; an unheated passage at the rear connecting said cooking passages; a trackway mounted over said passages; an endless conveyor chain in said track; means for regulating the speed of said conveyor chain through said speed control shaft; hooks depending from said conveyor chain; food holders detachably engaging said hooks; drip pans under said cooking passages; a drip shield under said unheated passage and bridging between said drip pans; and basting channels with perforated bottoms over the said cooking passages.

2. A broiler and toaster combination substantially as in claim 1, said heating elements on either side of the cooking passages being positioned in horizontal lines diminishing in length from top to bottom.

3. A broiler and toaster combination substantially as in claim 1, said heating elements of different lengths establishing three varying heat zones through said cooking passages.

References Cited in the file of this patent

UNITED STATES PATENTS

| Number | Name | Date |
| --- | --- | --- |
| 1,717,592 | Wheelock | June 18, 1929 |
| 1,771,762 | Allwine | July 29, 1930 |
| 2,069,824 | Engel et al. | Feb. 9, 1937 |
| 2,112,075 | DeMatteis et al. | Mar. 22, 1938 |
| 2,138,813 | Bemis | Dec. 6, 1938 |
| 2,151,105 | Hendershot et al. | Mar. 21, 1939 |
| 2,465,611 | Singer | Mar. 29, 1949 |
| 2,502,685 | Warner | Apr. 4, 1950 |

FOREIGN PATENTS

| Number | Country | Date |
| --- | --- | --- |
| 107,810 | Australia | June 20, 1937 |